(12) United States Patent
Feisst et al.

(10) Patent No.: US 7,283,086 B2
(45) Date of Patent: Oct. 16, 2007

(54) FILL LEVEL MEASURING DEVICE WORKING WITH MICROWAVES

(75) Inventors: Klaus Feisst, Kirchzarten (DE); Eric Bergmann, Steinen (DE)

(73) Assignee: Endress + Hauser GmbH + Co. K.G., Maulburg (DE)

( * ) Notice: Subject to any disclaimer, the term of this patent is extended or adjusted under 35 U.S.C. 154(b) by 692 days.

(21) Appl. No.: 10/844,311

(22) Filed: May 13, 2004

(65) Prior Publication Data

US 2005/0253751 A1 Nov. 17, 2005

(51) Int. Cl.
*G01S 13/08* (2006.01)
*G01S 7/282* (2006.01)

(52) U.S. Cl. .................... 342/124; 342/175; 73/290 R; 73/866.5

(58) Field of Classification Search ................ 342/124, 342/175; 73/204.22, 290 R, 290 V, 304 C, 73/304 R, 866.5; 324/644, 670, 678, 689; 333/245
See application file for complete search history.

(56) References Cited

U.S. PATENT DOCUMENTS

| | | | | |
|---|---|---|---|---|
| 4,806,847 A | * | 2/1989 | Atherton et al. | 73/304 C |
| 5,481,197 A | * | 1/1996 | Sanders et al. | 324/690 |
| 5,984,715 A | * | 11/1999 | Schmidt | 439/482 |
| 6,019,007 A | * | 2/2000 | Grieger et al. | 73/866.5 |
| 6,062,095 A | * | 5/2000 | Mulrooney et al. | 73/866.5 |
| 6,247,362 B1 | * | 6/2001 | Soroka | 73/290 V |
| 6,642,807 B1 | * | 11/2003 | Gard | 333/24 R |
| 6,750,808 B2 | * | 6/2004 | Faust | 342/124 |
| 6,820,510 B2 | * | 11/2004 | Schroth et al. | 73/866.5 |
| 7,134,315 B1 | * | 11/2006 | Stigler et al. | 73/290 V |
| 2004/0025588 A1 | * | 2/2004 | Schroth et al. | 73/304 C |
| 2004/0085240 A1 | * | 5/2004 | Faust | 342/124 |
| 2005/0253751 A1 | * | 11/2005 | Feisst et al. | 342/124 |

FOREIGN PATENT DOCUMENTS

WO WO 2005060042 A1 * 6/2005
WO WO 2006120124 A1 * 11/2006

* cited by examiner

*Primary Examiner*—John B Sotomayor
(74) *Attorney, Agent, or Firm*—Bacon & Thomas, PLLC

(57) ABSTRACT

A fill level measuring device working with microwaves is provided, with which, with very small inventory cost, many applications having a wide variety of different measuring conditions can be handled. The device includes a modularly assembled antenna, having a cylindrical segment closed at one end. A sending and/or receiving element for microwaves is arranged in the segment. A thread of fixed, predetermined diameter is provided on the open end of the segment. The antenna additionally has a radiating and/or intake element, on whose end facing the segment is provided a thread of the fixed, predetermined diameter. Optionally, the antenna has one or more cylindrical functional elements between the segment and the radiating and/or intake element, which have on both ends, in each case, threads with the fixed, predetermined diameter. The segment, the optional functional elements and the radiating and/or intake element are screwed together by means of the threads.

6 Claims, 1 Drawing Sheet

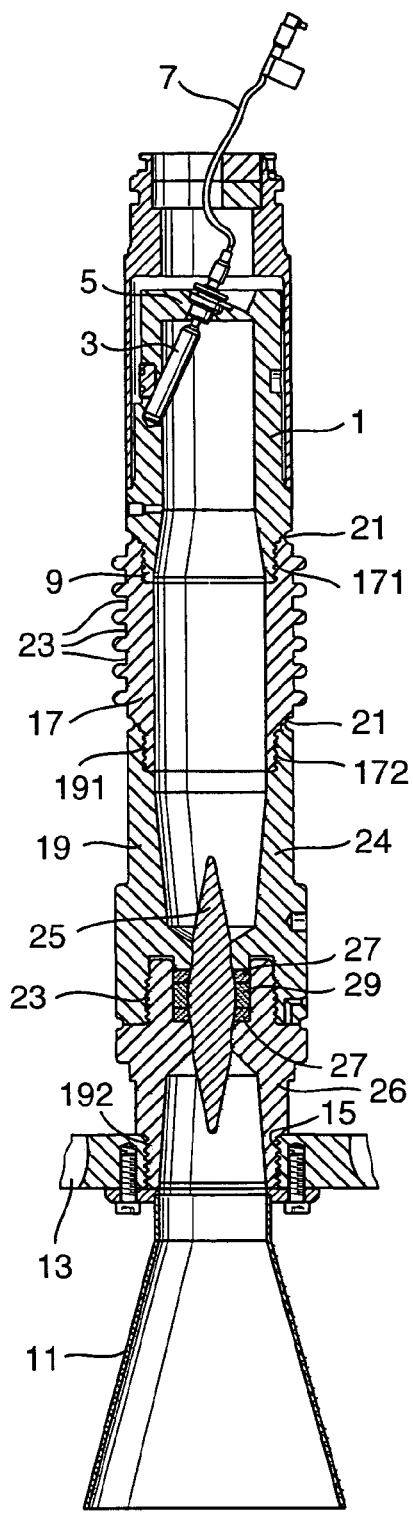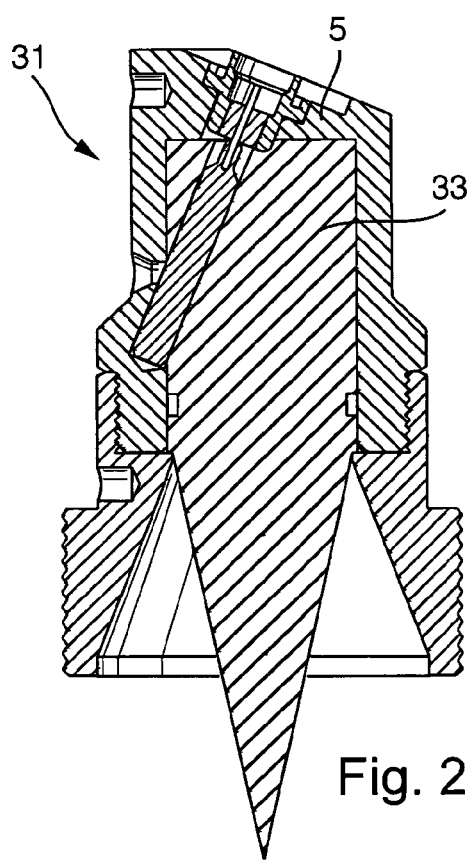
Fig. 1
Fig. 2

FILL LEVEL MEASURING DEVICE WORKING WITH MICROWAVES

FIELD OF THE INVENTION

The invention relates to a microwave-operated fill level measuring device having an antenna. The antenna has a cylindrical segment closed, or sealed, at one end and containing, within, a sending and/or receiving element. The antenna additionally has a radiating and/or intake element.

BACKGROUND OF THE INVENTION

In fill level measurement, microwaves are transmitted via an antenna to the surface of a fill substance and the echo waves reflected on the surface are received. An echo-function representing echo amplitudes as a function of distance is formed, from which the probable useful echo and its travel time are determined. The distance between the surface of the fill substance and the antenna is determined from the travel time.

All known methods that make it possible to measure relatively short distances by means of reflected microwaves can be applied. The best known examples are pulse radar and frequency modulation continuous wave radar (FMCW-Radar).

With pulse radar, short microwave send pulses, referenced in the following as wave packets, are periodically transmitted, reflected from the fill substance surface and received after a distance-dependent travel time. The received signal amplitude as a function of time represents the echo function. Each value of this echo-function corresponds to the amplitude of an echo reflected at a specific distance from the antenna.

With the FMCW method, a continuous microwave is sent that is periodically linearly frequency-modulated, for example according to a sawtooth wave function. The frequency of the received echo signal, therefore, has a frequency difference compared to the instantaneous frequency which the send signal has at the time of receipt. This frequency difference is a function of the travel time of the echo signal. The frequency difference between send signal and received signal, which can be determined by mixing both signals and evaluating the Fourier spectrum of the mixed signals, thus corresponds to the distance of the reflecting surface from the antenna. In addition, the amplitudes of the spectral lines determined through Fourier transformation correspond to the echo amplitudes. This Fourier spectrum, therefore, represents in this case the echo-function.

Fill level measuring devices working with microwaves are deployed in many branches of industry, e.g. in the chemicals industry and in the foods industry.

There are many applications in which fill level devices are exposed to extreme measuring conditions, e.g. high temperatures, high pressures and/or chemically aggressive substances. Fill level measuring devices working with microwaves have sensitive components, e.g. measuring instrument electronics and a sending and/or receiving element for microwaves, that cannot withstand such extreme conditions.

This problem and a solution therefor are described in EP-A 0 943 902. A microwave-based fill level measuring device with antenna is described there, which has a cylindrical segment closed at one end,
in which a microwaves sending and/or receiving element is arranged,
which has a radiating and/or intake element,
which has functional elements between the segment and the radiating and/or intake element.

One functional element described, among others, is a spacer, which serves to increase the separation between temperature sensitive components of the fill level measuring device and the radiating and/or intake element. A process separation is also described.

These functional elements protect the sensitive components of the microwave-based fill level measuring device against the circumstances of extreme measuring conditions. It is thus possible to deploy these fill level measuring devices in a multiplicity of very different applications.

A large number of different versions of fill level measuring devices working with microwaves are charged with serving this multiplicity of applications. Thus, for example, under simple measuring conditions, a fill level measuring device is used in which the segment which contains the sending and/or receiving element is directly connected to the radiating and/or intake element. If, in contrast, more extreme measuring conditions prevail, then corresponding functional elements are necessary for protecting the sensitive components of the fill level measuring device. For example, if high temperatures prevail at the location of measurement, then a spacer of adequate length is to be provided. If high pressures prevail, a sufficiently pressure resistant process separation is to be provided. A chemically highly resistant process separation is to be provided, in the case of chemically aggressive media.

This means a large variety of devices, which requires an accordingly large inventory for the manufacturer and the user.

SUMMARY OF THE INVENTION

It is therefore an object of the invention to provide a microwave-based fill level device, with which a large multiplicity of applications with the most diverse of measuring conditions can be served with very small inventory costs.

This task is solved pursuant to the invention by a fill level measuring device working with microwaves and having a modularly constructed antenna, which has a cylindrical, sealed segment closed at one end,
in which segment a microwave sending and/or receiving element is arranged,
on whose open end a thread of fixed, predetermined diameter is provided,
which has a radiating and/or intake element,
on whose end facing the segment a thread with the fixed, predetermined diameter is provided,
which has optionally one or more cylindrical, functional elements between the segment and the radiating and/or intake element,
which each has threads of the fixed, predetermined diameter on its two ends,
wherein the segment, the optionally present functional elements and the radiating and/or intake element are screwed together by means of the threads.

According to a first, further development, a weld connection is additionally provided in the area of two threads screwed together.

According to another further development, a functional element is a spacer piece, which serves to increase the separation between temperature sensitive components of the fill level measuring device and the radiating and/or intake element.

According to an embodiment of the last-described development, two or more spacer pieces are provided.

According to another further development, a functional element is a process separation.

According to another further development, the process separation is pressure-tight.

The invention and further advantages will now be described in more detail on the basis of the drawings, in which two examples of embodiments are shown; equal parts are provided with equal reference characters in the figures.

BRIEF DESCRIPTION OF THE DRAWINGS

FIG. 1 shows schematically a sectional view of a first illustrative embodiment of a modularly constructed antenna of a fill level measuring device working with microwaves; and FIG. 2 shows schematically a view of a dielectric-filled segment, in which a sending and receiving element are arranged.

DESCRIPTION OF THE PREFERRED EMBODIMENT

The antenna shown in FIG. 1 has four individual modules. A first module is a cylindrical segment 1 closed at one end. Arranged in segment 1 is a sending and/or receiving element 3 for microwaves. A rear wall 5 forms the closed end of segment 1. The segment 1 forms a circular hollow conductor, or waveguide. The sending and/or receiving element 3 is rod-shaped and functions as inner conductor. It terminates in the rear wall 5 of segment 1 and is attached to a coaxial cable 7 through the rear wall. A tip of the sending and/or receiving element 3 facing away from the rear wall is electrically conductively connected with a side wall of segment 1.

Such a sending and/or receiving element 3 is described in German patent application No. 103 59 867.7, filed Dec. 18,2003.

A housing, not shown in FIG. 1., can be fastened on the rear side of the segment, for accommodating a measuring device electronics. During transmitting, the sending and/or receiving element 3 is fed from a microwave source, preferably a component of the measuring device electronics, over the coaxial conductor 7. During receiving, received microwave signals are taken away in the reverse direction from the sending and/or receiving element 3 over the coaxial conductor 7 and fed to a further processing and/or evaluation.

The segment 1 has a thread 9 of fixed, predetermined diameter on its open end.

The segment 1 forms an end piece of the modularly constructed antenna, on which any further modules of the modularly constructed antenna can be mounted.

A radiating and/or intake element 11 is provided at an end of the antenna opposite to the segment 1. This serves to radiate microwave signals fed from the sending and/or receiving element 3 into the air or conversely to take up incoming microwave signals from the free space and to feed them to the sending and/or receiving element 3. For fill level measurement, microwave signals are sent towards a fill substance present at the location of measurement and their echo signals are received back, after a distance-dependent travel time. The distance between the antenna and the fill substance and thus the fill level of the fill substance are determined from the travel time. Usually the fill substance is in a container on which the antenna is mounted.

The radiating and/or intake element 11 in the illustrative embodiment is a funnel-shaped horn which is fastened on an mounting flange 13.

The radiating and/or intake element 11 has on its end facing segment 1 a thread 15 with the fixed, predetermined diameter. The diameter of the thread 15 is equal to the diameter of thread 9. The radiating and/or intake element 11 can, therefore, be screwed directly onto segment 1 by means of the threads 9 and 15.

One or more cylindrical functional elements can optionally be provided between segment 1 and the radiating and/or intake element 11. In the illustrated embodiment, for instance, two functional elements 17 and 19 are shown.

Each functional element 17, 19 has on both of its ends threads 171, 172, 191, 192 with the fixed, predetermined diameter. In the illustrated embodiment, the threads 171, 191 are implemented as internal threads and the threads 172, 192 are implemented as external threads Segment 1, the optionally present functional elements 17, 19, and the radiating and/or intake element 11 are screwed together with the threads 9, 171, 172, 191, 192, 15. For this, thread 9 is accordingly developed as an external thread and thread 15 as an internal thread.

The modular structure and the fixed, predetermined diameter of the threads 9, 171, 172, 191, 192, 15 make it possible to assemble the suitable antenna for any application from the individual modules. Therefore only the individual modules must be kept in stock, from which the version of the antenna, and thus of the fill level measuring device, desired for a particular application can be built. Yet, correspondingly many versions of the whole unit do not need to be kept.

This makes it possible for manufacturers, even with small inventory, to react quickly to orders and to cover a large range of possible applications. Likewise, users who serve many different measuring locations can reduce their inventory. Since the antennas can be assembled in a simple manner, users can, if necessary, manufacture suitable spare devices. Since the individual modules are compatible, a minimum inventory of spare parts are sufficient. Thereby, maintenance and repair costs are also reduced.

In addition to the described screw connections, a weld connection can be additionally be provided in the area of two threads screwed together. Such a weld connection is always used when the areas of the antenna affected thereby need to be made pressure- and/or gas-tight due to the special requirements of the application, or the measuring environment, as the case may be. In the embodiment illustrated in FIG. 1, in the areas of the screw connections formed by threads 9 and 171, as well as 191 and 172, circumferential grooves 21 are provided for correspondingly circumferential weld seams.

The functional element 17 shown in FIG. 1 is a spacer piece. It serves to increase the distance between temperature sensitive components of the fill level measuring device, e.g. a measuring electronics or microwave generator, and the radiating and/or uptake element 11. These components are protected thereby against overheating. To this end, the spacer piece is essentially tubular and has outer circumferential grooves 23, as an extra measure for increasing the heat-radiating surface of the spacer tube.

In the shown, illustrative embodiment, one spacer piece, the functional element 17, is provided by way of example. Thus, two or more spacer pieces could, as well, be provided. The greater the distance between the temperature-sensitive components of the fill level measuring device and the radiating and/or uptake element 11 and the greater the heat-radiating surface along this distance, the greater the temperatures at which the fill level measuring device can be used.

The functional element 19 is a process separation. It is composed of two sections 24, 26 connected together by a screw connection 22 and clamping a double-cone 25 between them. The tips of the double-cone 25 point outwards. The double-cone 25 completely seals an opening traversing the two sections 24, 26. A middle section of the double-cone 25 is surrounded by two graphite sealing rings 27 between which a ring 29, e.g. a metallic spacer ring or a graphite ring, is arranged. The double-cone 25 is made of a dielectric material, preferably a ceramic. Ceramic has the advantage, that it not only is highly resistant chemically, but also pressure resistant to a considerable degree. During transmitting and also during receiving, microwave signals are guided through the process separation via the double-cone 25.

Due to the use of ceramics and the high-quality seal, the process separation is extremely pressure resistant. A fill level measuring device equipped with this process separation can be used at pressures up to 16 MPa (160 bar).

FIG. 2 shows a section through a second illustrative embodiment for a segment 31 containing the sending and/or receiving element 3. Segment 31 is essentially identical to segment 1 shown in FIG. 1. For protection of the sending and/or receiving element 3, it is equipped with a dielectric insert 33, preferably made of polytetrafluoroethylene (PTFE). The insert 33 has a completely cylindrical section, which completely fills a cylindrical cavity of segment 31. Onto this is molded a truncated cone pointing away from the rear wall 5. This insert 33 is used particularly when the fill level measuring device is to be used in applications where no process separation is necessary.

A fill level measuring device equipped with this segment 31 can, for example, be deployed in a temperature range up to 150° C. If, additionally, a process separation is provided, then the fill level measuring device is useable at temperatures up to 280° C.

A fill level measuring device equipped with the antenna shown in FIG. 1 with spacer piece and process separation can even be deployed at temperatures up to 400° C. and pressures up to 16 MPa (160 bar).

The invention claimed is:

1. A fill level measuring device working with microwaves and having a modularly constructed antenna, comprising:
   a cylindrical segment closed at one end, in which segment a microwave sending and/or receiving element is arranged, and
   on whose open end a thread of fixed, predetermined diameter is provided;
   a radiating and/or intake element, on whose end facing the segment a thread with the fixed, predetermined diameter is provided; and
   optionally one or more cylindrical, functional elements situated between said segment and said radiating and/or intake element, wherein:
   on each of the two ends of said one more cylindrical, functional elements, threads are provided at fixed, predetermined diameter; and
   said segment, said optional functional elements and said radiating and/or intake element are screwed together by means of said threads.

2. The fill level measuring device as claimed in claim 1, wherein:
   in the area of two threads screwed together, a welded connection is additionally provided.

3. The fill level measuring device as claimed in claim 1, wherein:
   further comprising:
   a functional element serving a spacer piece which enlarges a distance between temperature sensitive components of the fill level measuring device and said radiating and/or intake element.

4. The fill level measuring device as claimed in claim 3, wherein:
   two or more spacer pieces are provided.

5. The fill level measuring device as claimed in claim 1, wherein:
   one of said functional element is a process separation.

6. The fill level measuring device as claimed in claim 5, wherein:
   the process separation is pressure-tight.

* * * * *